C. F. MASON.
VALVE.
APPLICATION FILED APR. 12, 1912.

1,041,316.

Patented Oct. 15, 1912.

WITNESSES:
J. A. Jamison.
C. M. Albee.

INVENTOR:
Charles F. Mason.
BY
G. H. Albee.
ATTORNEY.

COLUMBIA PLANOGRAPH CO., WASHINGTON, D. C.

UNITED STATES PATENT OFFICE.

CHARLES F. MASON, OF NEENAH, WISCONSIN.

VALVE.

1,041,316.  Specification of Letters Patent.  Patented Oct. 15, 1912.

Application filed April 12, 1912. Serial No. 690,389.

*To all whom it may concern:*

Be it known that I, CHARLES F. MASON, a citizen of the United States, residing at Neenah, in the county of Winnebago and State of Wisconsin, have invented a new and useful Two-in-One Valve, of which the following is a specification.

My invention is adapted for use as a vacuum breaker on dash pots of a Corliss engine, or on any vacuum chamber, and on the air inlet pipe of a gasolene engine, and its object is, to relieve the dash pot when applied to one upon a Corliss engine, of the noise produced therein in the operation of its piston, and to act as a muffler of the noise produced, in any place where the valve is adapted to be used.

Figure 3:
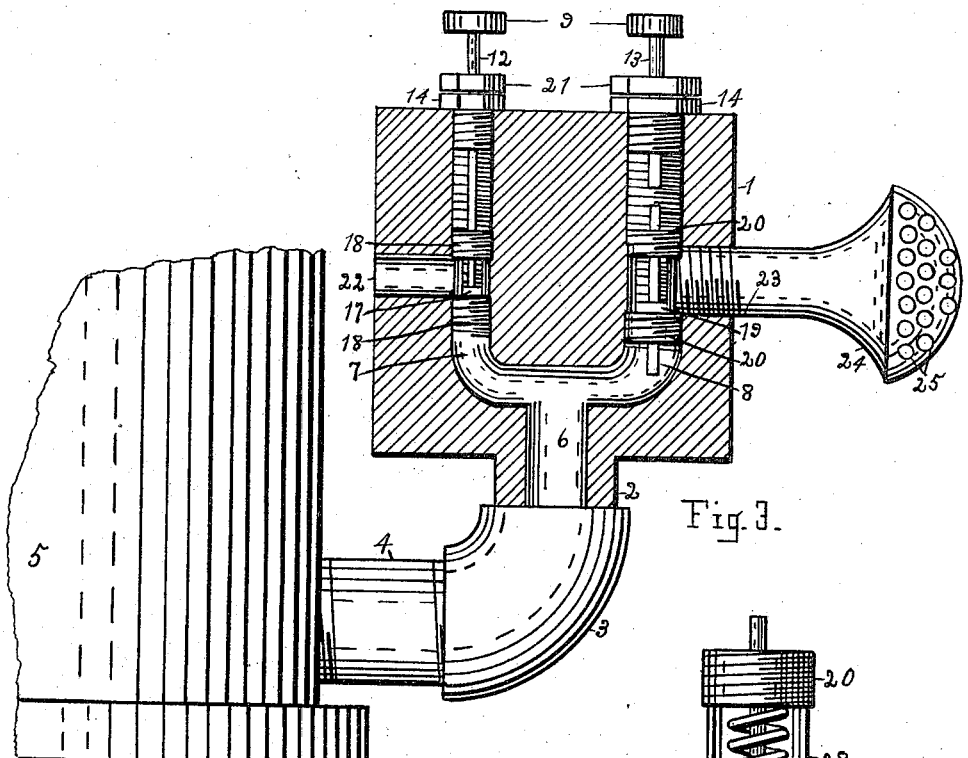
Figure 1:
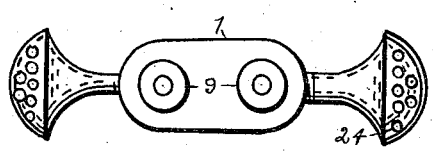
Figure 5:
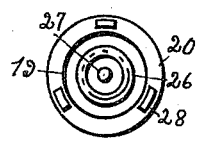
Figure 4:
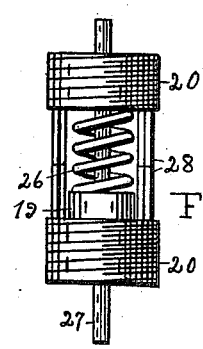
Figure 2:
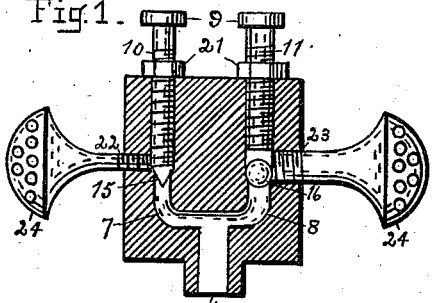
Figure 6:
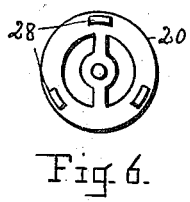

The invention is shown in the accompanying drawing, in which,

Figure 1 is a top view of the valve and its mufflers. Fig. 2 is a vertical section of the valve, the mufflers being in elevation. Fig. 3 is a vertical section of the valve, similar to Fig. 2, but with modifications in the valves thereof which are better adapted for the larger sizes of the two in one valves than the valves shown in Fig. 2. Fig. 4 is a side elevation upon a larger scale than previous figures of the check valve and its containing cages. Fig. 5 is a plan of one section of the cages with the valve therein. Fig. 6 is a plan of the lower cage.

Similar numerals indicate like parts in the several views.

1, indicates the body of the valve made of any suitable cast metal; 2, a nipple adapted to be screwed into such part as is adapted for its connection with the particular device with which it is to be connected, in the present case it being an elbow 3, for its connection by means of a pipe 4, with the base end of a dash pot 5. 6, is an admission channel and 7 and 8, two branch channels leading from the channel 6, extending upward to the top of the valve body and being provided each with a thumb screw head 9, by which the valves therein can be adjusted and their movements controlled. These channels it will be observed, are of different diameters of bores, the one connected with the air inlet at the left, being but about one half the diameter of the one at the right, that is provided with the outlet channel. 10 and 11, are threaded stems to the thumb screw heads 9, those in Fig. 2 being tapped into the channels 7 and 8, and those in Fig. 3, tapped into plugs 14, which are tapped into the channels 7 and 8, said plugs being provided with a screw threaded bore in each, for receiving the stems 12 and 13, respectively, and each channel 7 and 8, being provided with a valve, the channel 7 in Fig. 2, having the stem 10, formed into a needle valve 15, and the channel 8, having a ball valve 16, operating as a check valve. The opening degree of the needle valve can be controlled by means of the stem 10, and that of the check valve by the lower end of the stem 11. These valves may be of any suitable style of valves, the only requirement being, that the valve in place of 15, be capable of opening more or less and held in the required position, and that the valve in place of 16, be a check valve.

In Fig. 3, a valve 17, is shown as one of a type adapted for use in place of the needle valve 15, and is arranged within the cage sections 18, which cage sections are tapped into the channel 7, with which cage part the stem 12, is loosely connected and permanently with the valve 17. A valve 19, is arranged within cages 20, which are tapped into the channel 8, the stem 13, extending downward through the plug 14, and is arranged to gage the rise and fall of the check valve 19. By screwing the stems 10, 11, 12 and 13, out and in, the several valves can be operated as required. The several stems are each provided with a check nut 21, by means of which, when screwed down, the valves which said stems control can be held in a fixed position, or the opening of the check valve limited. Opposite the needle or other valve at the left hand side, an air inlet 22, is provided, and at the right hand side an outlet 23, into which latter, a muffler, 24, is inserted, the muffler consisting of the hollow semi-globular outer end provided with numerous perforations, 25. In some cases it may be advisable to attach a muffler to the air receiving channel 22, as is shown at the left of Fig. 2. In large devices of this kind it will not be found advisable to use the ball check valve on account of its weight, and therefore, for causing a quick closing of the check valve it may be advisable to apply a spring, as the coiled spring 26, upon the valve and around the valve stem 27, as is shown in Figs. 4 and 5. As before stated, I do not confine my invention to the use of any particular type of valves, for operation in the channels 7 and 8, but consider any valves that will perform the functions of the needle and ball valves, as within the scope of my invention. Fingers 28, integral with cage sections 18 and 20, space the two sections apart and provide room for a valve between each pair, but no claim is made to the cages.

The operation of the device is as follows:—A pressure being exerted through the inlet 6, the air receiving inlet 22, is opened to a certain degree, and the pressure relieved by the operation of the check valve, which acting in conjunction with the muffler, lessens the concussion and pounding noise produced by the operation of the piston of the dash pot.

Having described my invention, what I claim and desire to secure by Letters Patent, is,—

1. A two in one valve, comprising a metallic body of a suitable form, an inlet opening from one end thereof, a branch channel at one side of said inlet and extending through to the opposite side of the valve body, an air inlet intermediate the ends of said branch channel, a valve arranged near the junction of said air inlet and channel, means for opening and closing said valve, a second branch channel at the opposite side of said air inlet, an outlet intermediate the ends of said last named channel, a check valve arranged for operation between said last named channel and the outlet, and means for governing the extent of the opening of said check valve.

2. A two in one valve, comprising a metallic body of a suitable form, an inlet opening from one end thereof, a branch channel at one side of said inlet and extending through to the opposite side of the valve body, an air inlet intermediate the ends of said branch channel, a valve arranged near the junction of said air inlet and channel, means for opening and closing said valve, a second branch channel at the opposite side of said air inlet an outlet intermediate the ends of said last named channel, a check valve arranged for operation between said last named channel and the outlet, means for governing the extent of the opening of said check valve, and a muffler connected with said outlet.

3. A two in one valve, comprising a metallic body of a suitable form, an inlet opening from one end thereof, a branch channel at one side of said inlet and extending through to the opposite side of the valve body, an air inlet intermediate the ends of said branch channel, a valve arranged near the junction of said air inlet and channel, means for opening and closing said valve, a second branch channel at the opposite side of said air inlet, an outlet intermediate the ends of said last named channel, a check valve arranged for operation between said last named channel and said outlet, means for governing the extent of the opening of said check valve, and means for producing a quick closing of said check valve, such as a spring, mounted above the valve.

4. A two in one valve, comprising a metallic body of a suitable form, an inlet opening from one end thereof, a branch channel at one side of said inlet and extending through to the opposite side of the valve body, an air inlet intermediate the ends of said branch channel, a valve arranged near the junction of said air inlet and channel, means for opening and closing said valve, a muffler connected with said air inlet, a second branch channel at the opposite side of said air inlet, an outlet intermediate the ends of said last named channel, a check valve arranged for operation between said last named channel and the outlet, and means for governing the extent of the opening of said check valve.

5. A two in one valve, comprising a metallic body of a suitable form, an inlet opening from one end thereof, a branch channel at one side of said inlet and extending through to the opposite side of the valve body, an air inlet intermediate the ends of said branch channel, a valve arranged near the junction of said air inlet and channel, means for opening and closing said valve, a second branch channel at the opposite side of said air inlet of a much larger cross sectional area than that of the first named branch channel, an outlet intermediate the ends of said last named branch channel, a check valve arranged for operation between said channel and outlet, and means for governing the extent of the opening of said check valve.

CHARLES F. MASON.

Witnesses:
E. E. MERCHANT,
C. M. ALBEE.